(12) United States Patent  (10) Patent No.: US 9,222,495 B2
Flesch  (45) Date of Patent: Dec. 29, 2015

(54) LOCKING MECHANISM FOR MOVABLE COLUMN

(71) Applicant: Schwing Bioset, Inc., Somerset, WI (US)

(72) Inventor: Adam Flesch, New Richmond, WI (US)

(73) Assignee: Schwing Bioset, Inc., Somerset, WI (US)

( * ) Notice: Subject to any disclaimer, the term of this patent is extended or adjusted under 35 U.S.C. 154(b) by 47 days.

(21) Appl. No.: 14/256,531

(22) Filed: Apr. 18, 2014

(65) Prior Publication Data

US 2015/0300390 A1    Oct. 22, 2015

(51) Int. Cl.
*F16M 13/00* (2006.01)
*F16B 7/04* (2006.01)

(52) U.S. Cl.
CPC ..................... *F16B 7/042* (2013.01)

(58) Field of Classification Search
CPC .......... F16B 7/00; F16B 7/042; F16B 7/0413; F16B 7/0406; F16B 7/04
USPC ........................................................ 248/558
See application file for complete search history.

(56) References Cited

U.S. PATENT DOCUMENTS

| 3,368,574 | A | * | 2/1968 | Yates et al. ................. 135/88.15 |
| 5,092,194 | A | * | 3/1992 | Oliver et al. ................. 74/500.5 |
| 6,516,875 | B2 | | 2/2003 | Reilly et al. |
| 7,886,819 | B2 | | 2/2011 | Setterberg, Jr. et al. |

* cited by examiner

*Primary Examiner* — Mark Wendell
(74) *Attorney, Agent, or Firm* — Kinney & Lange, P.A.

(57) ABSTRACT

One embodiment includes an assembly with a movable column with an upper end and a lower end, wherein the lower end includes a recessed opening. The assembly also includes a locking foot assembly with a base foot and a locking mechanism. The locking mechanism includes a latch which is spring biased and at least partially extends outward from the base foot such that the latch comes into contact with the lower end of the movable column and is retractable inward into the base foot when the spring is compressed, such that the latch of the locking mechanism can both engage and disengage the recessed opening in the lower end of the movable column.

18 Claims, 7 Drawing Sheets

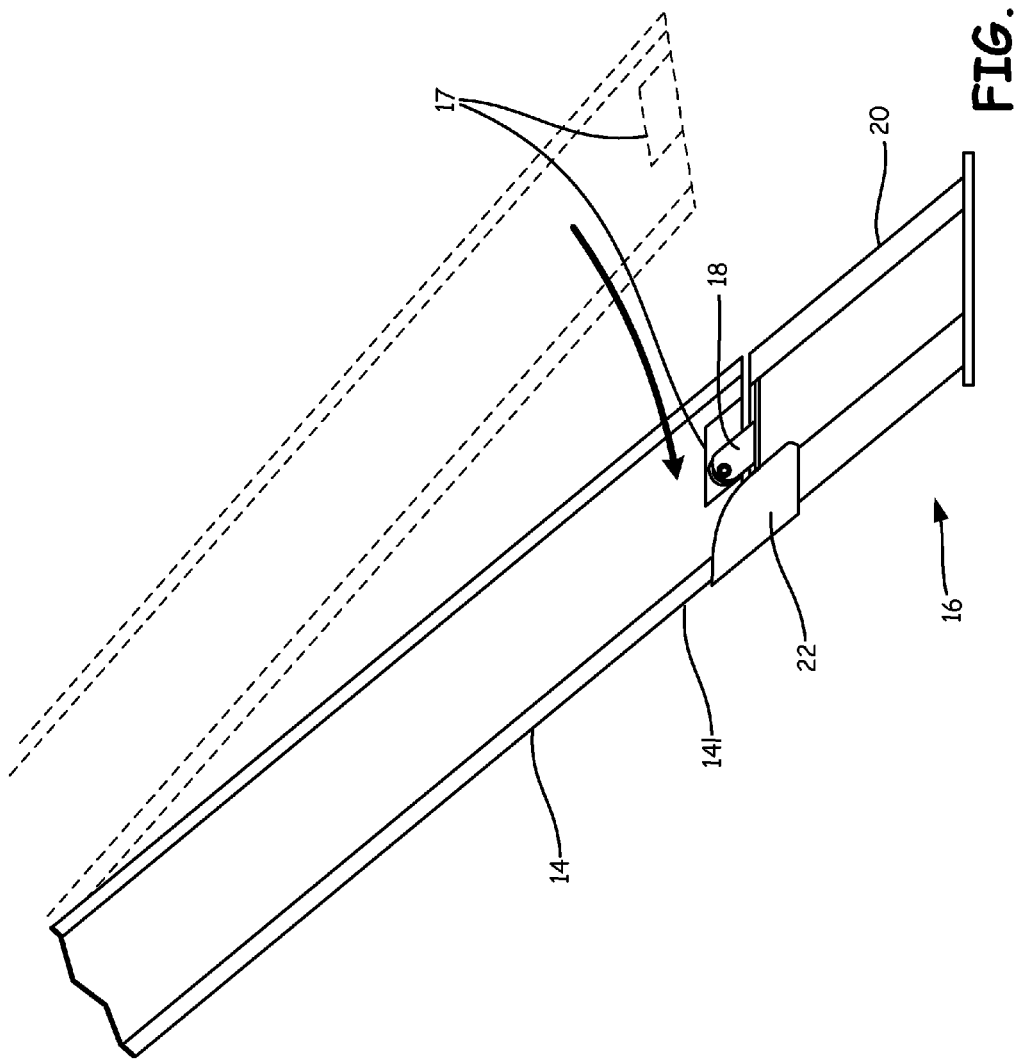

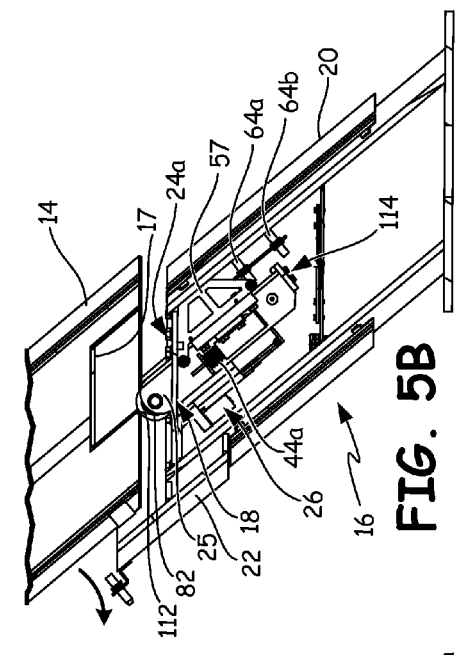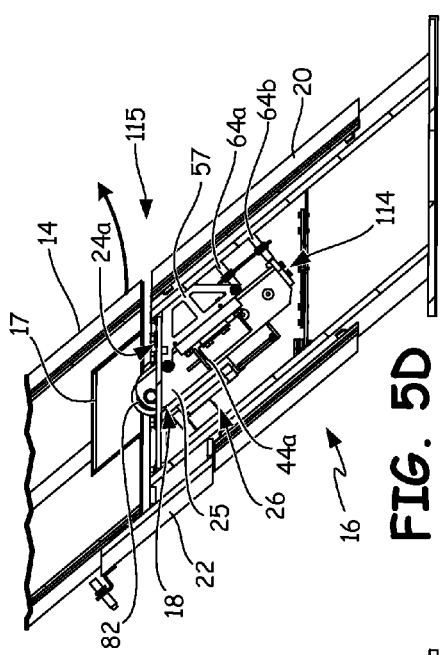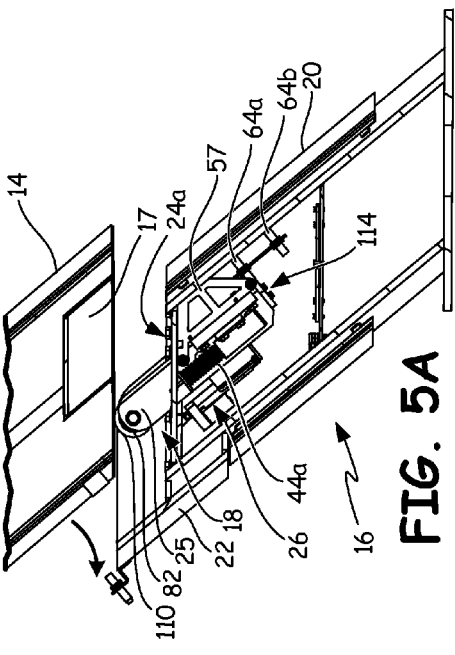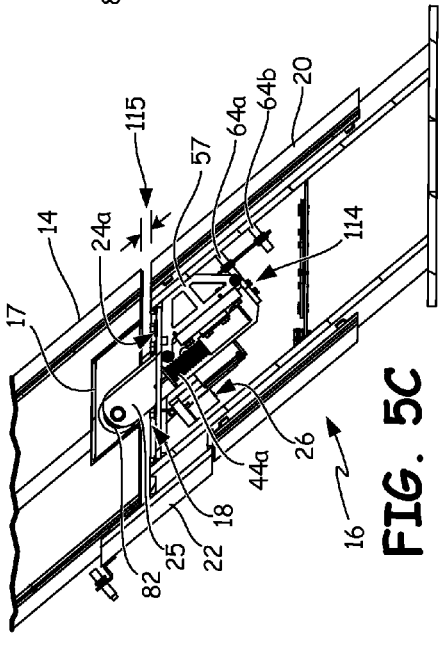

LOCKING MECHANISM FOR MOVABLE COLUMN

BACKGROUND

The presently disclosed embodiments relate generally to a mechanism for locking a movable column at a desired location.

Structures can be designed where the structure includes columns, or other components of the structure, which may be movable between a first position and a second position, as well as a range of positions between the first position and the second position. For example, a structure may have multiple columns which pivot from a fixed location on one column end between a range of locations at the other column end. This allows the structure to include columns which may be moved at any time.

In one application, it may be desirable to design a structure with movable columns as a way to provide shading to the structure. For instance, where at least a portion of the structure includes a glass exterior, such as on the structure's roof, movable columns can be used in conjunction with the glass exterior. The movable columns can be made to move throughout the day to shade the glass exterior from the sun, without blocking light from entering through the glass exterior. In this application, the movable columns can be used to provide significant energy efficiencies to the structure.

However, for a structure to effectively utilize movable columns as part of the structure's design, the structure must have the ability to lock the movable columns into place at a predetermined location when desired. Otherwise, the movable columns may move unintentionally, such as by wind forces, putting the structure at risk for damage.

SUMMARY

One embodiment includes an assembly with a movable column with an upper end and a lower end, with the lower end including a recessed opening. The assembly also includes a locking foot assembly with a base foot and a locking mechanism. The locking mechanism includes a latch which is spring biased and at least partially extends outward from the base foot such that the latch comes into contact with the lower end of the movable column and is retractable inward into the base foot when the spring is compressed, such that the latch of the locking mechanism can both engage and disengage the recessed opening in the lower end of the movable column.

Another embodiment includes a locking foot assembly with a base foot with an upper end and a lower end. Also included is a locking mechanism secured at or near the upper end of the base foot. The locking mechanism includes a movable latch having a lower end of the movable latch inside the base foot and an upper end of the movable latch spring biased to extend out from the upper end of the base foot.

A further embodiment includes a locking mechanism with a mount secured in place to an upper end of a base foot. The locking mechanism also includes a latch biased by a spring and movable relative to the mount, a bearing secured to an upper end of the latch, a first proximity switch secured to the mount and located at or near a lower end of the latch when the latch extends out from the base foot, and a second proximity switch secured to the mount and spaced from the first proximity switch.

BRIEF DESCRIPTION OF THE DRAWINGS

FIG. 2 is a side elevational view of a column pivoting from a fixed position on one column end clockwise into the locking foot at the second column end.

FIGS. 5A-5D are cross-sectional, side elevational views of stages in a locking engagement and disengagement sequence.

DETAILED DESCRIPTION

Generally, a movable column can automatically be locked in place at a locking foot assembly by a locking mechanism when the movable column traverses over the locking foot assembly. Then, the movable column can be selectively released from the locking foot assembly such that it is free to move.

Figure 1A:
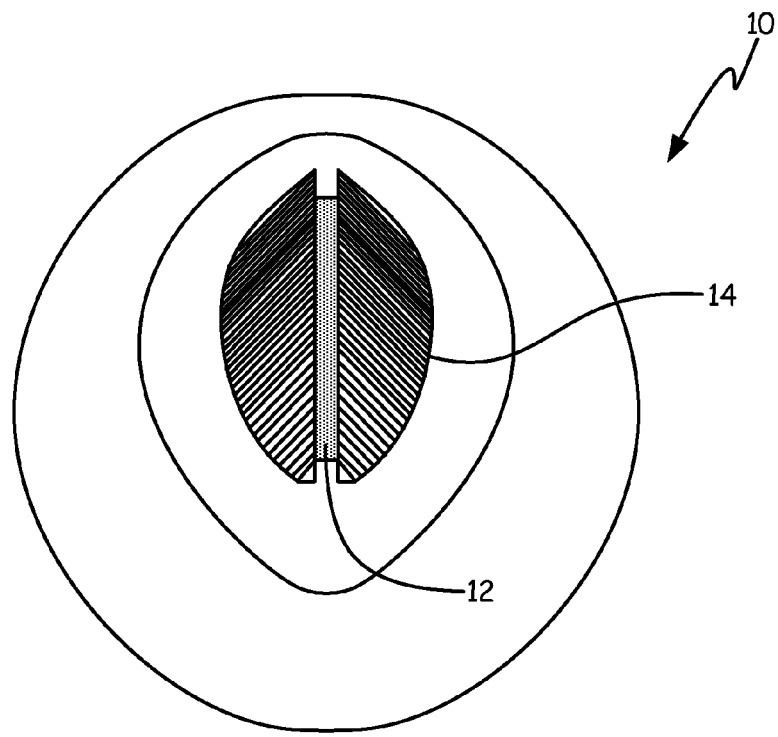
FIG. 1A is a perspective view of a structure with movable columns.
Figure 1B:
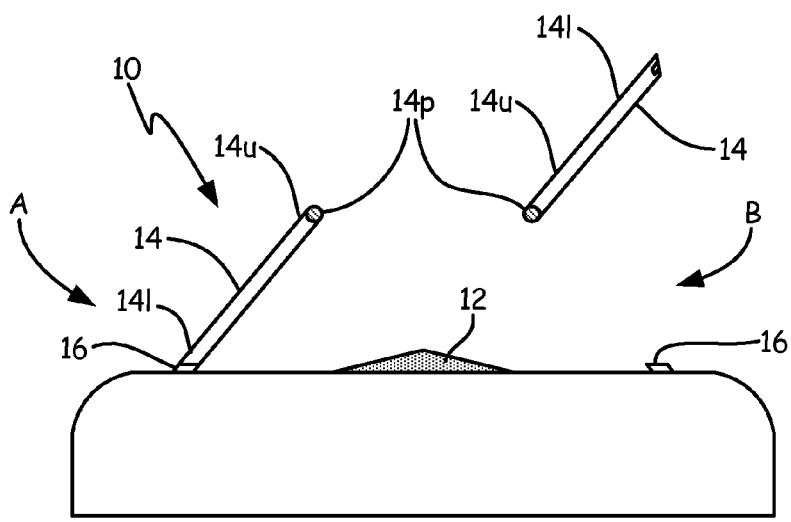
FIG. 1B is a side elevational view of the structure of FIG. 1A.

FIGS. 1A and 1B show schematic structure 10. Structure 10 is a building capable of achieving significant energy efficiencies by selectively shading at least some transparent components of structure 10 as the sun moves throughout the day. FIG. 1A is a perspective view of structure 10. FIG. 1B is a side elevational view of structure 10. Included in FIGS. 1A and 1B are glass exterior 12 of structure 10, movable columns 14 with lower ends 14*l*, upper ends 14*u*, and fixed pivot points 14*p*, locking foot assemblies 16, side A of structure 10, and side B of structure 10. Glass exterior 12 is a transparent component of structure 10 through which outside light enters structure 10. Glass exterior 12 may, for example, provide the ceiling of an interior atrium of structure 10. Movable columns 14 are each fixed at upper end 14*u* at pivot point 14*p*, and may be locked in place at lower end 14*l* at locking foot assembly 16. Locking foot assemblies 16 are secured to structure 10, for example by bolts.

As shown in FIG. 1B, on side A of structure 10 movable columns 14 are locked in place at locking foot assemblies 16 at lower ends 14*l*, such that these movable columns 14 are prevented from moving. However, on side B of structure 10 movable columns 14 are not locked in place at locking foot assemblies 16 at lower ends 14*l*, and as such are raised and free to move. In the illustrated embodiment, movable columns 14 move by being pivoted about fixed pivot points 14*p*, such that lower ends 14*l* of movable columns 14 raise up from locking foot assemblies 16. Movable columns 14 can be pivoted about fixed pivot points 14*p* by an actuator or any other suitable mechanism. Each movable column 14 may pivot and raise up individually or in conjunction with other movable columns 14. For example, where side A faces east, movable columns 14 on side A begin locked in place at locking foot assemblies 16, as shown in FIG. 1B, but are unlocked as the sun begins to rise. Then, throughout the day as the sun moves, movable columns 14 on side A begin to pivot in a clockwise direction and slowly raise up from locking foot assemblies 16. Where side B faces west, when the sun begins to rise movable columns 14 on side B start at a raised up position as shown in FIG. 1B. Then, movable columns 14 on side B begin to pivot in a clockwise direction slowly moving down closer to locking foot assemblies 16 throughout the day as the sun moves from east to west. This synchronized movement of movable columns 14 on sides A and B allows structure 10 to shade glass exterior 12 from the sun, without blocking light from entering through glass exterior 12. As a result, structure 10 is able to achieve significant energy efficiencies.

FIG. 2 is a side elevational view of movable column 14 and locking foot assembly 16 of FIGS. 1A and 1B. Column 14 includes recessed opening 17 at lower end 14*l*, and locking foot assembly 16 includes locking mechanism 18, base foot 20, and alignment correction deflector 22. Locking mechanism 18 is disposed partially outside of base foot 20, with the remainder of locking mechanism 18 disposed inside of base foot 20. Alignment correction deflector 22 is secured to base foot 20 with a portion of alignment correction deflector extending above base foot 20. Column 14 pivots from pivot point 14*p* (shown in FIG. 1B) and may be locked in place at locking foot assembly 16. As column 14 approaches locking foot assembly 16, locking mechanism 18 comes into contact with lower end 14*l* of column 14. Column 14 continues to move in the same direction until locking mechanism 18 springs into opening 17. At this point, movement of column 14 is obstructed by locking mechanism 18 as shown in FIG. 2, and thus column 14 is now locked in place at locking foot assembly 16 (further detailed in FIGS. 5A-5D). Alignment correction deflector 22 may serve to both provide additional guidance to column 14 when column 14 is traversing over locking foot assembly 16 and also to prevent nominal movements of column 14 as a result of any extra clearance in opening 17 not occupied by locking mechanism 18.

Figure 3:
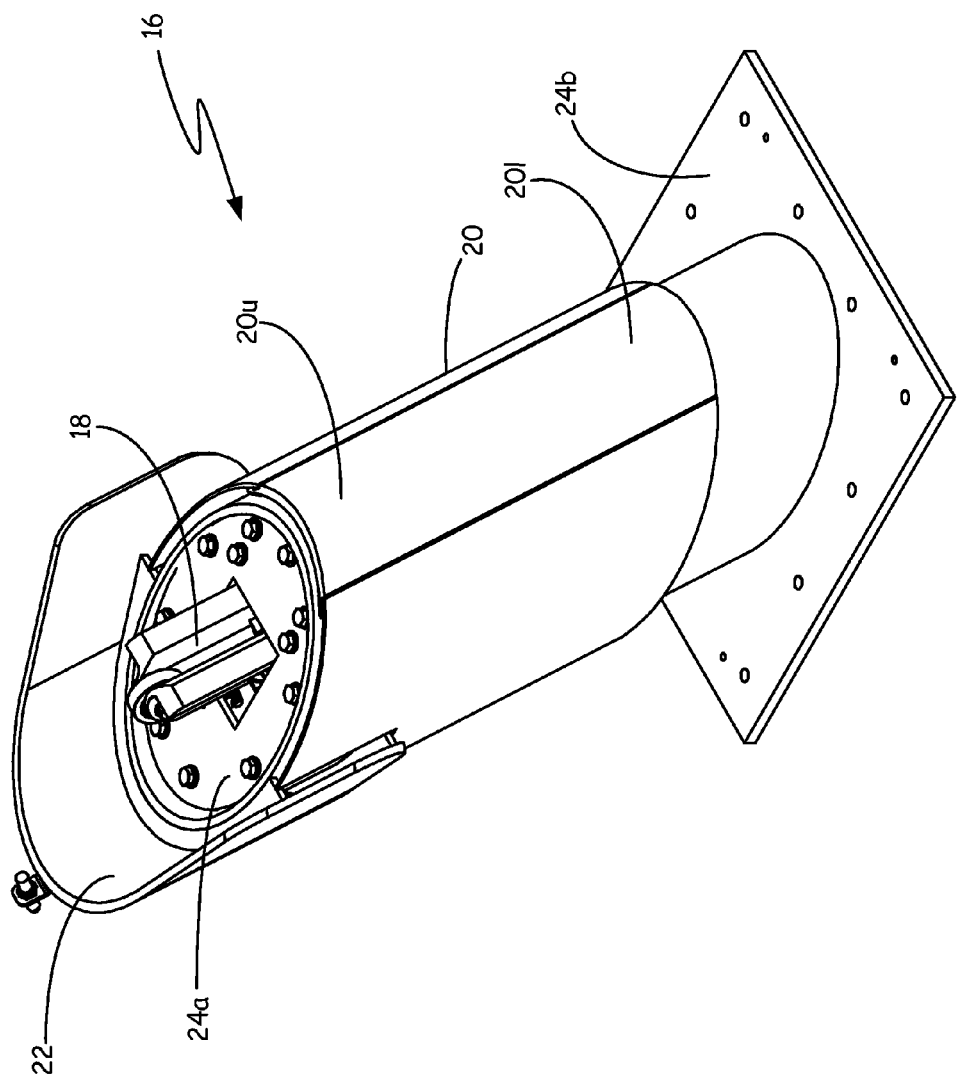
FIG. 3 is a perspective view of the locking foot of FIG. 2.

FIG. 3 is a perspective view of locking foot assembly 16 of FIGS. 1B and 2. Included, in addition to that shown and described previously, are lower end 20*l* and upper end 20*u* of base foot 20 and plates 24*a* and 24*b*. Plate 24*a* is secured to base foot 20, such as through a bolt or screw connection, in a manner that allows plate 24*a* to be easily removed from base foot 20 so that locking mechanism 18 is also easily removable from base foot 20 for inspection and/or repair. Locking mechanism 18 extends from inside base foot 20 through plate 24*a*, such that locking mechanism 18 comes into contact with column 14. Plate 24*b* is secured to base foot 20 on one side, such as through a welded connection, and secured to structure 10 on the other side, such as through a bolt connection, allowing base foot 20 to be secured to structure 10. Thus, both plates 24*a* and 24*b* are secured to base foot 20, and as such form part of base foot 20. Base foot 20 is shown angled here, so as to compliment the angle at which column 14 pivots when approaching locking foot assembly 16. However, in other embodiments base foot 20 can be angled differently or straight, extending vertically from plate 24*b*, depending on the application and the angle at which column 14 moves.

Figure 4A:
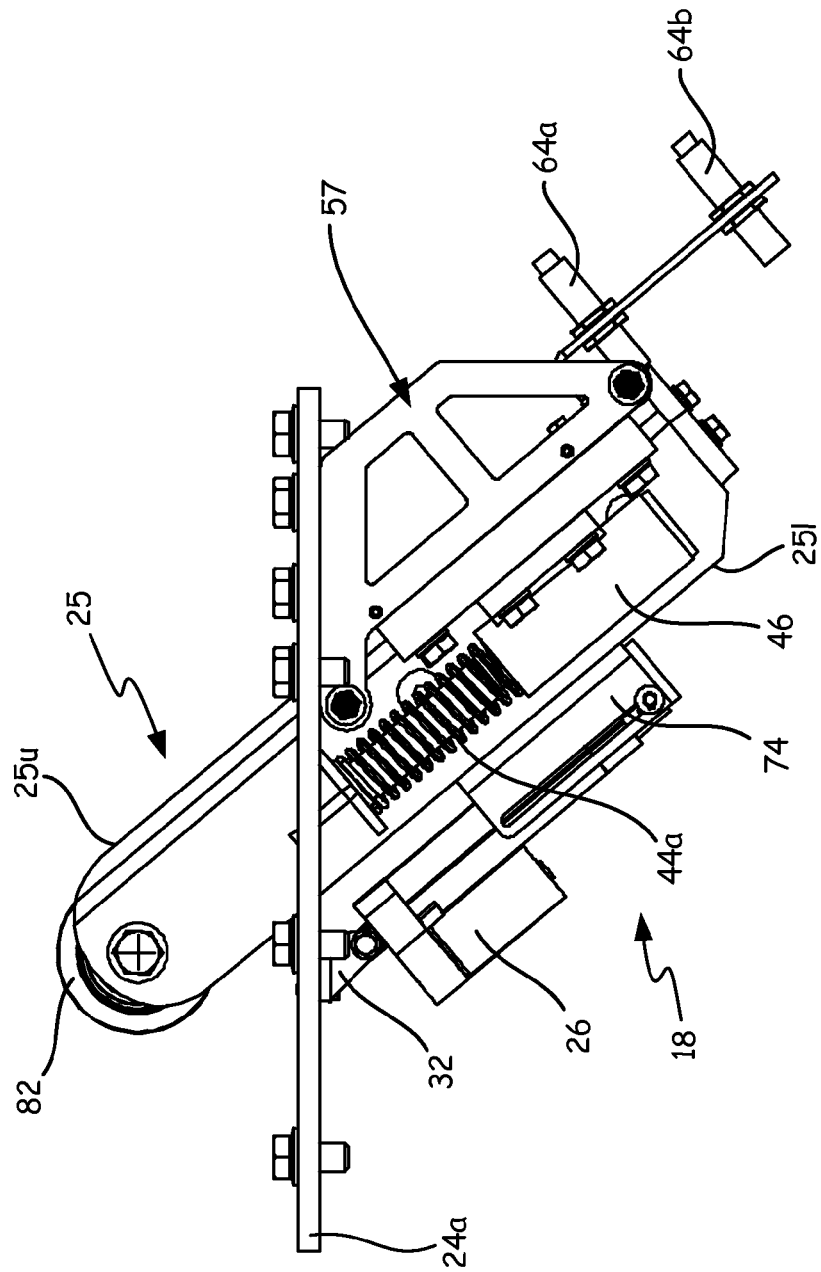
FIGS. 4A-4C show details of a locking mechanism of the locking foot of FIGS. 1-3.
Figure 4B:
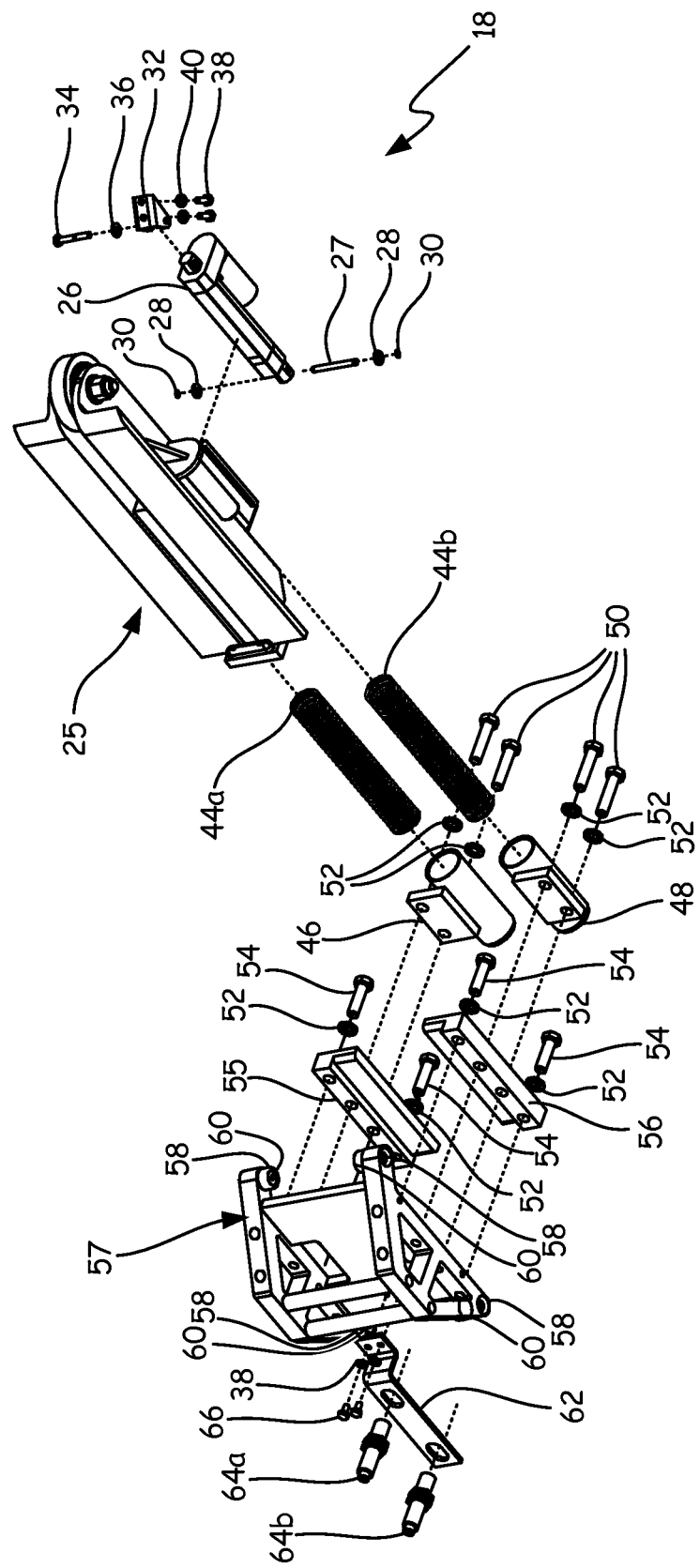
Figure 4C:
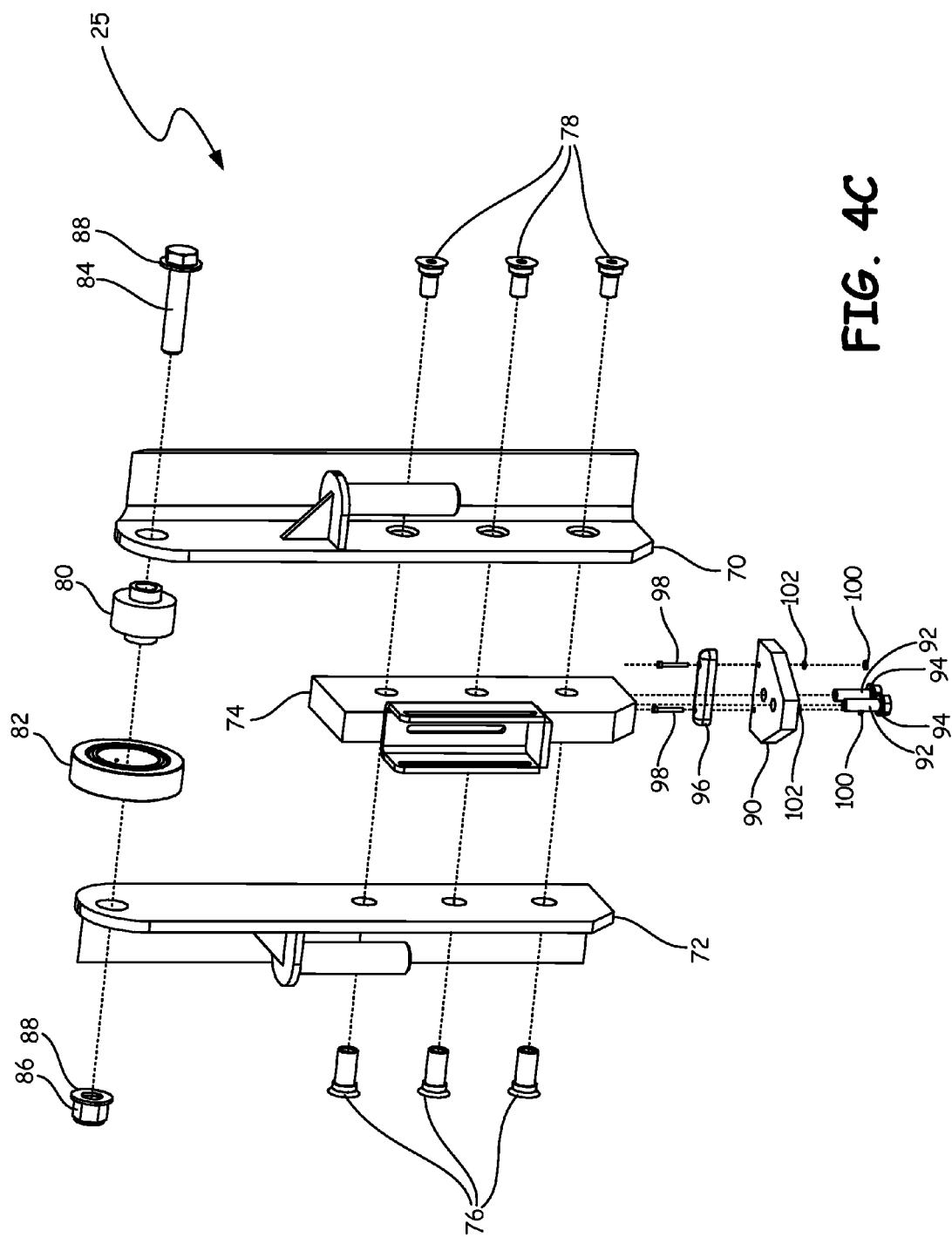

FIGS. 4A-4C show details of locking mechanism 18. FIG. 4A is a side elevational view of locking mechanism 18 mounted to plate 24*a*. FIG. 4B is an exploded, perspective view of locking mechanism 18 of FIG. 4A. FIG. 4C is an exploded, perspective view of latch 25 of locking mechanism 18 of FIGS. 4A and 4B. Included, in addition to that shown and described previously, are latch 25 with lower end 25*l* and upper end 25*u*, actuator 26, actuator slide pin 27, washers 28, rings 30, bracket 32, screw 34, washer 36, screws 38, washers 40, springs 44*a* and 44*b*, first spring keeper 46, second spring keeper 48, screws 50, washers 52, screws 54, first bar 55 and second bar 56, latch mount 57, bearings 58, nuts 60, proximity switch mount plate 62, proximity switches 64*a* and 64*b*, and screws 66. Latch 25 includes first latch slide 70, second latch slide 72, actuator carrier 74, female bolts 76, male bolts 78, bearing carrier shaft 80, bearing 82, screw 84, nut 86, washers 88, latch plate 90, screws 92, washers 94, bumper 96, screws 98, nuts 100, and washers 102.

Locking mechanism 18 is assembled as shown in FIG. 4B. On one end, actuator 26 is secured to latch 25 (at actuator carrier 74) by slide pin 27 and secured in place by washers 28 and rings 30. On the other end, actuator 26 is mounted to plate 24*a* by bracket 32, which is connected to actuator 26 by screw 34 and washer 36 and mounted to plate 24*a* by screws 38 and washers 40. In the present embodiment, actuator 26 is an electric actuator with a maximum linear output of approximately 150 pounds (68 kg). However, in other embodiment various other types of actuators may be used. Spring 44*a* extends from latch 25 and into first spring keeper 46, and spring 44*b* extends from latch 25 and into second spring keeper 48. First spring keeper 46 is connected to first bar 55, which is in turn connected to latch mount 57, by screws 50 and washers 52. Second spring keeper 48 is connected to second bar 56, which is in turn connected to latch mount 57, by screws 50 and washers 52. First bar 55 is additionally connected to latch mount 57 by washers 52 and screws 54. Second bar 56 is additionally connected to latch mount 57 by washers 52 and screws 54. Latch mount 57 is secured to plate 24*a* and thus upper end 20*u* of base foot 20 as shown in FIGS. 3 and 4A, providing a connection between locking mechanism 18 and base foot 20 which allows locking mechanism 18 to easily be removed from base foot 20. Latch mount 57 includes bearings 58 secured to latch mount 57 by nuts 60. Bearings 58 allow latch 25 to slide up and down smoothly within latch mount 57. Mounted to plate 62 are proximity switches 64*a* and 64*b*, such that proximity switch 64*a* is located at or near lower end 25*l* of latch 25 and proximity switch 64*b* is spaced from proximity switch 64*a*. Plate 62 is secured to latch mount 57 by screws 66 and washers 38.

Latch 25 is assembled as shown in FIG. 4C. First slide 70 and second slide 72 have actuator carrier 74 located between them, with first slide 70, second slide 72, and actuator carrier 74 all connected by female bolts 76 and male bolts 78. Also located between first slide 70 and second slide 72 is shaft 80 which carries bearing 82. Thus, bearing 82 is secured to locking mechanism 18 at upper end 25*u* of latch 25. Bearing 82 shown here is a roller bearing. However, bearing 82 may alternatively be a ball bearing, or other type of bearing, in other embodiments. Shaft 80, and thus bearing 82, is connected to first slide 70 and second slide 72 by screw 84, nut 86, and washers 88. Latch plate 90 is secured to actuator carrier 74 by screws 92 and washers 94. Secured to latch plate 90 is bumper 96 by screws 98, nuts 100, and washers 102. Locking mechanism 18 is secured at or near upper end 20*u* of base foot 20, such that lower end 25*l* of latch 25 is disposed inside of base foot 20 while upper end 25*u* of latch 25 is spring biased to extend out from upper end 20*u* of base foot 20 (as shown in FIGS. 3 and 4A).

When assembled, locking mechanism 18 operates to lock column 14 in place at base foot 20. FIGS. 5A-5D show cross-section, side elevational views of stages in a locking engagement and disengagement sequence. FIG. 5A shows a first stage in a locking engagement sequence where column 14 first comes into contact with locking mechanism 18. FIG. 5B shows a second stage in a locking engagement sequence where latch 25 of locking mechanism 18 has been pushed down. FIG. 5C shows a final stage in a locking engagement sequence where column 14 is locked in place at locking foot assembly 16 by locking mechanism 18. FIG. 5D shows a locking disengagement, such that column 14 is free to move. Included, in addition to that shown and described previously, are locations 110 and 112, proximity switch target 114, and clearance 115.

As shown in FIG. 5A, as column 14 pivots and begins to move over locking foot assembly 16, column 14 comes into contact with locking mechanism 18, specifically bearing 82 of locking mechanism 18, at location 110. Bearing 82 provides an anti-friction interface between column 14 and locking mechanism 18, which allows column 14 to continue to move over locking foot assembly 16 once contact is made with locking mechanism 18. Once contact is made, latch 25 of locking mechanism 18 is continually pushed down, or retracted inward, further into base foot 20 by the downward force of column 14 as column 14 continues to move over locking foot assembly 16. As latch 25 is pushed down by column 14, springs 44a and 44b (44b not shown) are compressed. While latch 25 slides down, actuator 26 and latch mount 57 remain fixed within base foot 20, as both are connected to base foot 20. Proximity switches 64a and 64b also remain stationary because they are fixed to latch mount 57, and are used to indicate the location of latch 25.

Latch 25 continues to be pushed down by column 14 until bearing 82 reaches roll-over location 112, shown in FIG. 5B. Once bearing 82 is at roll-over location 112, the next movement of column 14 results in bearing 82 no longer maintaining contact with column 14 due to opening 17 in lower end 14l of column 14. As a result, the compression induced into springs 44a and 44b causes latch 25 to spring into opening 17 of column 14, as shown in FIG. 5C. Column 14 is now locked in place at locking foot assembly 16 by locking mechanism 18, because locking mechanism 18 inside opening 17 prevents column 14 from pivoting. Locking mechanism 18 then remains in the locked position inside opening 17 independently, without requiring any force. Thus, column 14 is automatically locked in place, and stays locked in place, without requiring any assistance from actuator 26 or any other power source, but rather uses the downward force supplied by column 14 itself to lock column 14 in place. When in the locked position, locking mechanism 18 of the present embodiment can withstand 5500 pounds (24,465 Newton) of uplift force applied on column 14 due to wind. As shown in FIG. 5C, proximity switch 64a is in line with proximity switch target 114, indicating locking mechanism 18 is in a locked state. Also, when column 14 is locked at locking foot assembly 16, designed clearance 115 is present between column 14 and base foot 20. Clearance 115 allows for thermal growth of column 14 without obstructing the presently described locking sequence. Clearance 115 in the illustrated embodiment is approximately 0.75 inch (1.9 cm), but can vary in other embodiments depending on the material, length of column 14, and/or the temperatures the material is expected to be exposed to.

In order for column 14 to be able to move once again, locking mechanism 18 must disengage from the locked position shown in FIG. 5C, such that movement of column 14 is no longer obstructed. To unlock column 14, actuator 26 is used to retract latch 25 down into base foot 20 until proximity switch 64b is in line with proximity switch target 114, as shown in FIG. 5D. Once latch 25 is retracted by actuator 26 to this point, column 14 is again able to pivot free of locking foot assembly 16. In other embodiments latch 25 can be manually retracted, such as when actuator 26 is malfunctioning. For instance, a pry bar can be used to retract latch 25 by placing the pry bar on latch plate 90 and using the pry bar to pull latch 25 down.

In conclusion, locking foot assembly 16 provides a simplified way to secure movable column 14 in place at locking foot assembly 16. Locking mechanism 18, of locking foot assembly 16, uses the downward force supplied by contact with column 14 to automatically lock column 14 in place. Column 14 can then be released from locking foot assembly 16 by retracting locking mechanism 18, allowing column 14 to freely move.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
  a movable column with an upper end and a lower end wherein the lower end includes a recessed opening; and
  a locking foot assembly comprising a base foot and a locking mechanism, wherein the base foot includes a tubular housing, a bottom plate attached a lower end of the housing, and a top plate attached to an upper end of the housing, the top plate having an aperture, and wherein the locking mechanism is attached to the top plate and includes a latch which is spring biased and at least partially extends outward from the base foot through the aperture in the top plate such that the latch comes into contact with the lower end of the movable column as the lowered of the movable column moves into a position adjacent the top plate of the base foot, and is retractable inward into the base foot when the spring is compressed, such that the latch of the locking mechanism can both engage and disengage the recessed opening in the lower end of the movable column.

2. The assembly of claim 1, further comprising an alignment correction deflector secured to the base foot.

3. The assembly of claim 1, wherein the base foot is secured to a structure.

4. The assembly of claim 1, further comprising a bearing secured to the latch of the locking mechanism at a location where the latch comes into contact with the lower end of the movable column.

5. The assembly of claim 4, wherein the bearing and at least part of the latch both extend out from the base foot and both retract inward toward the base foot when the bearing initially comes into contact with the lower end of the movable column.

6. The assembly of claim 1, wherein the locking mechanism is removably secured to the base foot.

7. A locking foot assembly comprising:
  a base foot with an upper end and a lower end;
  a locking mechanism secured at or near the upper end of the base foot, wherein the locking mechanism includes a movable latch having a lower end of the movable latch inside the base foot and an upper end of the movable latch spring biased to extend out from the upper end of the base foot; and
  an alignment correction deflector secured to the upper end of the base foot and which extends out above the upper end of the base foot.

8. The assembly of claim 7, wherein the lower end of the base foot is secured to a structure.

9. The assembly of claim 7, further comprising a bearing secured to the locking mechanism at the upper end of the movable latch.

10. The assembly of claim 7, wherein the locking mechanism is removably secured at or near the upper end of the base foot.

11. The assembly of claim 7, further comprising:
  a first proximity switch located at or near the lower end of the movable latch; and
  a second proximity switch spaced from the first proximity switch.

12. A locking mechanism comprising:
a mount secured in place to an upper end of a base foot;
a latch biased by a spring and movable relative to the mount;
a bearing secured to an upper end of the latch;
a first proximity switch secured to the mount and located at or near a lower end of the latch when the latch extends out from the base foot; and
a second proximity switch secured to the mount and spaced from the first proximity switch.

13. The locking mechanism of claim 12, wherein the bearing is a roller bearing.

14. The locking mechanism of claim 12, further comprising an actuator secured to the latch.

15. The locking mechanism of claim 14, wherein the actuator is an electric actuator.

16. The locking mechanism of claim 14, wherein the latch comprises:
a first slide;
a second slide connected to the first slide; and
an actuator carrier secured between the first slide and the second slide, wherein the actuator is secured to the actuator carrier.

17. The locking mechanism of claim 16, wherein the bearing is secured between the first slide and the second slide.

18. A locking foot assembly comprising:
a base foot with an upper end and a lower end;
a locking mechanism secured at or near the upper end of the base foot, wherein the locking mechanism includes a movable latch having a lower end of the movable latch inside the base foot and an upper end of the movable latch spring biased to extend out from the upper end of the base foot;
an alignment correction deflector secured to the upper end of the base foot and which extends out above the upper end of the base foot;
a first proximity switch located at or near the lower end of the movable latch; and
a second proximity switch spaced from the first proximity switch.

* * * * *